United States Patent [19]

Stumpf, Jr.

[11] Patent Number: 4,723,880

[45] Date of Patent: Feb. 9, 1988

[54] SHORING BEAM STORAGE RACK

[76] Inventor: Charles W. Stumpf, Jr., 3530 Manchester Dr., Bettendorf, Iowa 52722

[21] Appl. No.: 41,199

[22] Filed: Apr. 22, 1987

[51] Int. Cl.⁴ .......................... E05B 73/00; B60P 7/12
[52] U.S. Cl. ........................................ 410/143; 211/4; 211/87; 248/552; 410/156
[58] Field of Search .................. 410/143–145, 410/150–152, 31, 32, 42, 47, 48, 153, 156, 52, 77; 211/4, 60.1, 87; 248/551, 552

[56] References Cited

U.S. PATENT DOCUMENTS

| 3,059,593 | 10/1962 | Mack | 410/151 |
| 3,831,892 | 8/1974 | Herman | 211/4 X |
| 4,009,853 | 3/1977 | Lile | 248/552 X |
| 4,139,100 | 2/1979 | Reed | 211/4 |
| 4,662,805 | 5/1987 | Tamez et al. | 211/4 X |

FOREIGN PATENT DOCUMENTS 1173603  12/1969  United Kingdom ................ 248/552

Primary Examiner—David A. Scherbel
Assistant Examiner—Scott H. Werny
Attorney, Agent, or Firm—Robert O. Richardson

[57] ABSTRACT

A shoring beam storage rack comprising an upper extrusion shoring bracket for encasing one end of a shoring beam and a lower extruded locking tongue receiving the extensible portion of the other end of the shoring beam, for storing and locking the shoring beam in a vertical position at the rear end of a transportation vehicle.

3 Claims, 5 Drawing Figures

SHORING BEAM STORAGE RACK

BACKGROUND OF THE INVENTION

Large truck semi-trailers are not always filled to capacity with cargo. In such cases the cargo may shift when the truck stops abruptly, accelerates or makes sudden turns. This shift in cargo is a safety hazard to the truck driver, cargo and truck and many accidents have occured, causing damage to the truck and cargo, and injury or death to the truck driver. To overcome the foregoing problem the trucking industry has developed a shoring beam which bears against the cargo and fits at its ends to a grid of trackways on the side walls of the interior of the cargo trailer.

These trackways form a grid vertically and/or horizontally on both sides of the truck or trailer interior so that the shoring beam extends across, in back of, and against the cargo regardless of how much cargo is in the trailer or truck.

These shoring beams are light, portable and are the subject of pilfering. When a truck is being loaded and its shoring beams are missing, the truck driver will take shoring beams from parked empty trucks and use them. Subsequently, when a driver and cargo is assigned to the empty truck with shoring beams missing, the driver must look into other trucks and "borrow" shoring beams has become so serious that trucking firms are now requiring drivers to buy and furnish their own shoring beams. When a driver leaves an empty truck he must take his shoring beams with him or risk losing them to another truck and driver.

SUMMARY OF PRESENT INVENTION

In accordance with the present invention a shoring beam storage rack is provided in the truck or trailer in which the shoring beam is used. This rack comprises an upper bracket and a lower tongue fastened to a side wall. The upper end of a vertically positioned beam fits within the upper bracket. The lower end of the beam has a slot through which the lower tongue protudes. This tongue has an opening at its outer end through which the shackle of a padlock is passed to lock the shoring beam on the inside side wall of the truck or trailer.

The cost of the bracket, tongue and padlock is quite small compared to the cost of losing a shoring beam.

DETAILED DESCRIPTION OF PREFERRED EMBODIMENT

Figure 1:
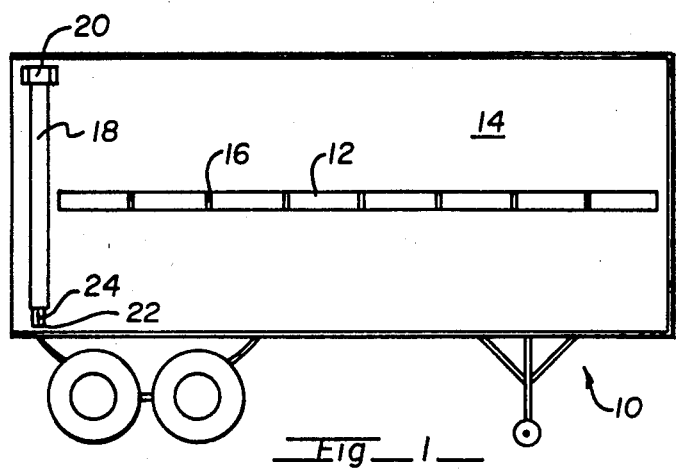
FIG. 1 is a side view of a truck showing a shoring beam trackway and a shoring beam stored at the rear of the truck.

Reference is now made to FIG. 1 wherein there is shown a transportation vehicle such as a semi-trailer 10 with a trackway 12 mounted on the inside side wall 14. Typically this trackway has slots or openings 16 to receive the end fittings of a shoring beam 18 shown in vertical stored position at the rear of the trailer. A second beam 18A is shown (FIG.2) in position of use between the two side walls. The upper end of the shoring beam fits within bracket 20 mounted on the side wall 14 of the truck trailer 10. The lower end of the shoring beam has an extension 22 with a longitudinal slot through which a tongue 24 extends. This tongue is mounted on the lower end of the side wall 14 and has an opening in its outer end through which a padlock shackle may be inserted in locking the shoring beam 18 in stored position.

Figure 2:
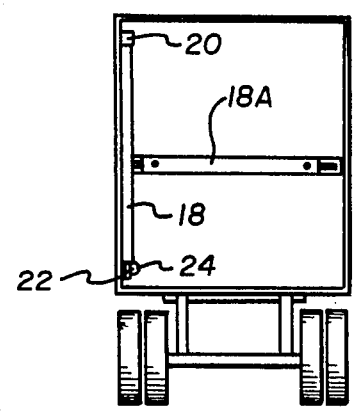
FIG. 2 is an end view showing the shoring beam extending between the sides of a transportation vehicle.

FIG. 2 is an end view showing the shoring beam 18 in vertical stored position. The top end of the beam 18 is shown inserted into the side wall mounted bracket 20. The lower end of beam 18 has an extension 22 with a longitudinal slot therein which is passed over the side wall tongue 24 which has an opening 26 through which shackle 28 of padlock 30, shown in FIG. 5, is placed to lock the shoring beam 18 in stored position.

Figure 3:
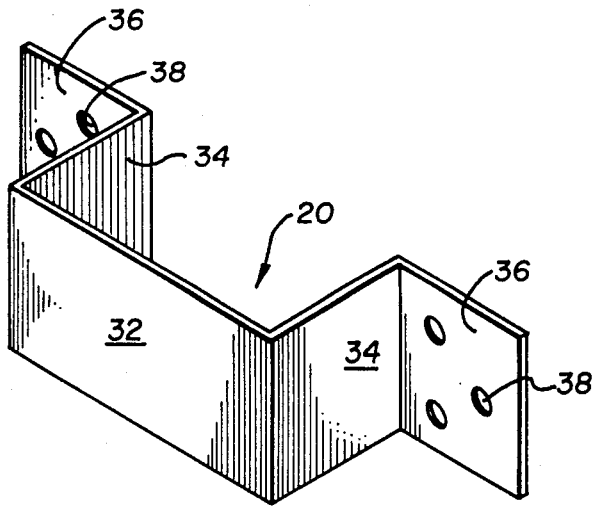
FIG. 3 is a perspective view of the upper bracket.

FIG. 3 is a perspective view of bracket 20. This bracket is preferably a section of an extrusion about 4" in length. It has a front face 32 of about 3½" inside width and sides 34 of about 3¼" inside depth. At the rear of sides 34 are mounting flanges 36 with apertures 38 for fastening the bracket to the inside wall of a trailer or truck. These inside dimensions are such that when the bracket lower edge is placed about 7 feet above the lower edge of the mouting tongue, the bracket 30 can receive an end of the shoring beam 18 with its extension 22 collapsed. (Both slotted extensions on the ends of beam 18 are collapsible. When held vertically gravity will cause the upper extension to collapse into the beam.) Gravity will also cause the lower beam extension 22 to extend downwardly from the lower end. This exposes the slot 32 in the lower end extension 22 so it can be received by the tongue 24 shown in FIG. 4.

Figure 4:
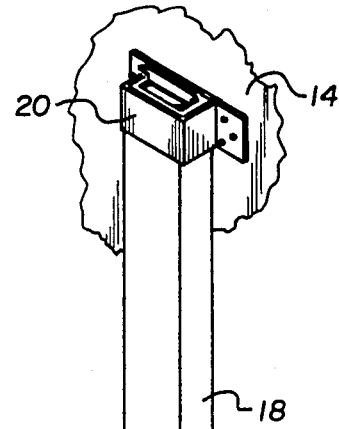
FIG. 4 is a perspective view of the lower tongue.

Tongue 24 in FIG. 4 is also preferably an extrusion, about 1" in width to accomodate slot 32 of lower shoring beam extension 22. The tongue is approximately 3½" long and its opening 26 is about 7/16" from its outer end. This permits insertion of the lower beam extension inwardly of the opening. Mounting flanges 40 have apetures 42 for fastening the tongue 24 to the lower end of the inside wall of a transportation vehicle. Mounting the tongue with lower edge about 3" above the bed or floor of the vehicle is recommended to permit clearance of the lower extension when inserted over the tongue.

Figure 5:
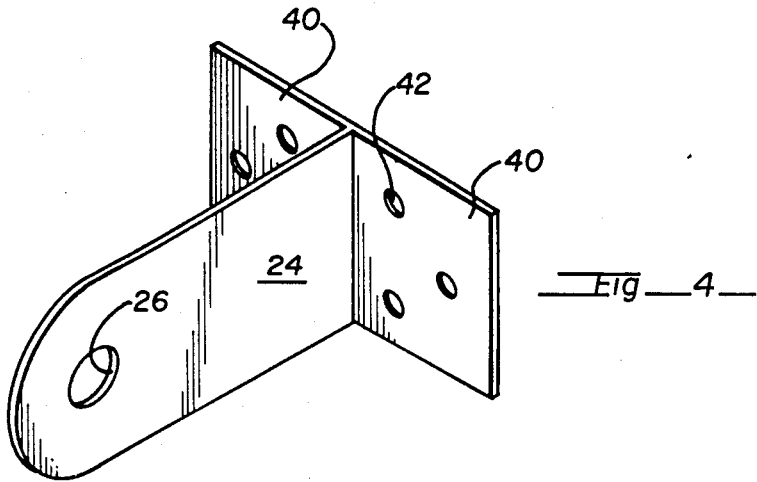
FIG. 5 is a perspective view of a shoring beam in locked position on the storage rack.

FIG. 5 is a perspective view of the shoring beam 18 in stored locked position. It is substantially as shown in FIG. 1 except that the beam 18, upper bracket 20, lower tongue 24 and padlock 30 are enlarged to shown greater detail. It should be noted that in placing the beam, its upper end should be placed within upper bracket 20 first and then the lower extension 22 is placed over the tongue 24. The lower end of beam 18 rests on the top edge of tongue 24 to prevent further downward movement of the beam and accidental disengagement of the upper beam end from bracket 20.

While the foregoing description is of the preferred embodiment of the present invention, it is to be understood that various modifications and improvements are within the ability of one skilled in the art and that such deviations from the foregoing are to be considered as part of the present invention as set forth in the following claims.

What is claimed is:

1. In combination with a shoring beam having extensions at each end thereof with slots therein, and a vertical wall for fastening said beam thereto, a shoring beam storage rack comprising:

an upper bracket encasing the upper end of a vertically oriented shoring beam, said upper bracket being attached to said wall, a tongue fastened to said wall near the bottom thereof and generally vertically aligned with said upper bracket, said tongue extending through the slot in the extension of said beam at the lower end thereof, said tongue having an opening near the outer end thereof and outwardly of said extension when said extension is placed over said tongue, and a padlock with its shackle extending through said tongue opening to lock said beam in a vertical position to said wall and prevent unauthorized removal thereof.

2. The combination as set forth in claim 1 wherein said upper bracket has a front face with sides extending rearwardly therefrom, and mounting flanges extending outwardly from the rear edges of said sides, said front face and said sides having inside dimensions sufficiently large enough to receive the upper end of said shoring beam therebetween.

3. The combination as set forth in claim 1 wherein said tongue has a longitudinal width less than the vertical length of the slot in the extension at the lower end of said shoring beam to permit passage of said extension over said tongue, said tongue having a length sufficient to receive said extension rearwardly of said tongue opening.

* * * * *